United States Patent
Matthews

(10) Patent No.: US 11,764,432 B2
(45) Date of Patent: Sep. 19, 2023

(54) AGGREGATED BATTERY SYSTEM

(71) Applicant: Tesla, Inc., Austin, TX (US)

(72) Inventor: Kevin Cornelius Matthews, Reno, NV (US)

(73) Assignee: Tesla, Inc., Austin, TX (US)

( * ) Notice: Subject to any disclaimer, the term of this patent is extended or adjusted under 35 U.S.C. 154(b) by 384 days.

(21) Appl. No.: 16/367,975

(22) Filed: Mar. 28, 2019

(65) Prior Publication Data

US 2019/0312251 A1 Oct. 10, 2019

Related U.S. Application Data

(60) Provisional application No. 62/675,501, filed on May 23, 2018, provisional application No. 62/654,933, filed on Apr. 9, 2018.

(51) Int. Cl.
| | |
|---|---|
| *H01M 50/213* | (2021.01) |
| *H01M 50/519* | (2021.01) |
| *H01M 50/526* | (2021.01) |
| *H01M 50/284* | (2021.01) |
| *H01M 50/51* | (2021.01) |
| *H01M 50/512* | (2021.01) |

(52) U.S. Cl.
CPC ....... *H01M 50/213* (2021.01); *H01M 50/284* (2021.01); *H01M 50/51* (2021.01); *H01M 50/512* (2021.01); *H01M 50/519* (2021.01); *H01M 50/526* (2021.01)

(58) Field of Classification Search
CPC .................... H01M 50/519; H01M 50/526
See application file for complete search history.

(56) References Cited

U.S. PATENT DOCUMENTS

| | | | |
|---|---|---|---|
| 2005/0202319 A1* | 9/2005 | Kim ................ | H01M 10/052 429/233 |
| 2007/0009787 A1* | 1/2007 | Straubel ............ | H01M 50/502 429/99 |
| 2011/0059352 A1* | 3/2011 | Lee ................. | H01M 10/0431 429/164 |
| 2011/0129720 A1* | 6/2011 | Yun ................. | H01M 50/538 429/159 |
| 2017/0005376 A1 | 1/2017 | Porter | |
| 2017/0194610 A1* | 7/2017 | Tschiggfrei ........ | H01M 50/20 |
| 2018/0190960 A1* | 7/2018 | Harris .............. | H01M 50/502 |
| 2018/0287127 A1* | 10/2018 | Onnerud ........... | B60L 50/64 |

* cited by examiner

*Primary Examiner* — Robert S Carrico

(74) *Attorney, Agent, or Firm* — Knobbe, Martens, Olson & Bear, LLP

(57) ABSTRACT

A battery system includes multiple cells arranged in a common cell enclosure that can also be used for a structure and heat transfer fluid conduit. The battery system also includes a first collector plate. The first collector plate has multiple collector tabs that correspond to the multiple cells. Each collector tab is connected to a cathode of a corresponding cell from amongst the multiple cells present in the battery system.

28 Claims, 13 Drawing Sheets

AGGREGATED BATTERY SYSTEM

CROSS REFERENCE TO RELATED PATENTS

The present U.S. Utility Patent Application claims priority pursuant to 35 U.S.C. § 119(e) to U.S. Provisional Application No. 62/654,933, entitled "BATTERY PACK", filed Apr. 9, 2018; and U.S. Provisional Application No. 62/675,501, entitled "AGGREGATED BATTERY SYSTEM", filed May 23, 2018, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND

Technical Field

The present disclosure relates to a battery system for energy storage and more particularly to a battery system that is produced with a minimized cost per unit kilowatt-hour of the battery system.

Description of Related Art

Battery systems are currently used to serve as energy sources in electric-vehicle and energy-storage applications. Battery systems are typically made from multiple components, including individual battery cells, electrical current transmission systems, temperature control systems, safety systems, battery management systems (BMS), and structural support. Integrating these systems and their respective functionalities into a battery system can increase component count and add to manufacturing complexity besides incurring additional costs. There are many advantages to using small format battery cells in a battery system. These advantages could include one or more of manufacturing yield, safety, thermal management, and a better structure for containing volumetric expansion from charge/discharge cycles and thermal events, in turn, enabling higher energy density chemistries for the battery system. Manufacturing yield of small format cells is typically higher because a shorter length of electrode material that is devoid of material defects would be required. However, on the other hand, small format cells can increase complexity in the manufacture of the battery system arising from at least one of a positioning of the cells when a large number of the small format cells is being used to form the battery system, and adequate provisions would need to be made for facilitating the conveyance of current from such a large number of small format cells. For instance, with use of many small format cells, it is envisioned that several electrical interconnects could be required to accomplish the conveyance of current from the large number of small format cells and this may also contribute to the complexity in design and manufacture of the battery system. The battery cell could also have some functionalities that may be redundant when aggregated into the battery system. As each battery cell would be manufactured independently of others, time and resources would need to be spent thereafter for combining the cells and for forming the interconnects to the current collectors typically, though a welding, or soldering process. Hence, there is a need to produce battery modules in a simplified manner.

Figure 1:
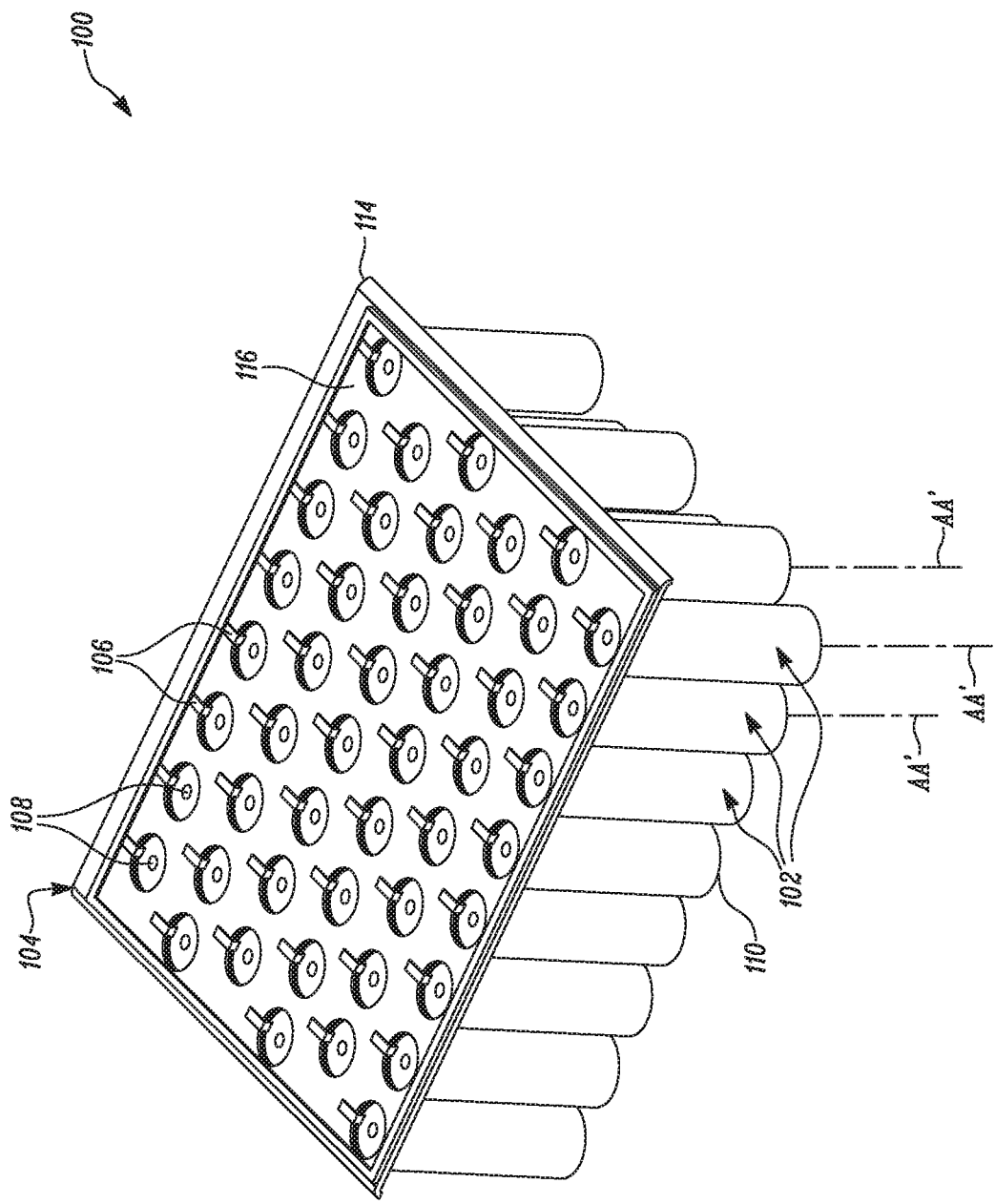
FIG. 1 illustrates a battery system showing a first collector plate that is used to connect multiple cells of the battery system, according to certain embodiments of the present disclosure.

Embodiments of the present disclosure and their corresponding advantages are best understood by referring to the detailed description that follows. It should be appreciated that like reference numerals are used to identify like elements illustrated in one or more of the figures, wherein drawings shown therein are for purposes of illustrating embodiments of the present disclosure and not for purposes of limiting the same.

DETAILED DESCRIPTION OF THE DISCLOSURE

The present disclosure relates to a battery system. More particularly, the present disclosure relates to a battery system that may be combined with other battery systems into a battery module in order to entail reduced combination time and resource requirements for the production of the battery module.

The present disclosure provides solutions by which battery modules and/or battery systems may be manufactured with much less complexity than prior art approaches including at a cost per unit kilowatt-hour of the battery that is minimized for the entire process. The present disclosure provides solutions to leverage and hence, take advantage of the benefits offered by small format battery cells while reducing redundant components and simplifying the manufacturing process required to produce the resultant battery system.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 illustrates a battery system 100 in accordance with certain embodiments of the present disclosure. As shown, the battery system 100 has multiple cells 102. In certain embodiments of the present disclosure, although each cell 102 would be embodied, preferably, in the form of a secondary cell, for example, a rechargeable Lithium-ion (Li-ion) cell, although aspects of the present disclosure can be similarly applied to produce battery systems using primary cells and for minimizing costs per kilowatt-hour of such battery systems. These primary cells would include cells that are typically non-rechargeable in nature and hence, unfit for reuse upon being discharged.

As shown in FIG. 1, the cells 102 are arranged in an upright manner such that axes AA' of the cells 102 are parallel to one another. In other embodiments of the present disclosure, the cells 102 are all similarly oriented, but not upright. The battery system 100 also includes a first collector plate 104. The first collector plate 104 has multiple collector tabs 106 that connect to the multiple cells 102 present in the battery system 100. Each collector tab 106 can be connected to the positive terminal 108 of the cell 102, which, in turn, would be connected to the internal cathode current collector (not shown) of the cell 102. The positive terminal 108 may be a portion of the top of the cell 102, substantially all of the top of the cell, or elsewhere on the cell 102. The collector tab 106 is then connected to a first collector plate 104, for example, through connection to the top side 116 of the first collector plate 104. The first collector plate 104 also includes a collector overhang portion 114, which may be used to connect multiple battery systems to one another as part of an overall module design. In certain embodiments of the present disclosure, the collector plate/s disclosed herein could also have features such as, but not limited to, sense circuits and fuses to aid in the safety and performance of the battery system 100. Also, in certain embodiments of the present disclosure, the overhang portion/s makes it easy to interconnect battery systems and eliminates the need for additional material to do so and therefore, reduces assembly costs.

Typically, cell manufacturing requires high purity, high precision manufacturing. Aggregation of the cells into larger systems (sometimes referred to as modules, packs, or another aggregate structure) typically occurs in a less-clean environment, like a standard electrical assembly factory space. This system-level design may be performed such that all the discrete, high-precision, high-part-count operations occur in the same part of the manufacturing process, thereby reducing complexity and improving net cell to system yield.

The cell enclosure manufacturing includes cost savings itself. Currently, in the draw/redraw process used to manufacture cell cans, there is significant amount of scrap in the space between adjacently located circular cut-outs. For example, in one manufacturing method for the primary cell enclosure, a press or forge is used. This process eliminates scrap and all the material used in the process would subsequently serve a useful purpose in the battery system that is manufactured using the process. In the process of the current disclosure, the substrate may be warmed (~300° C.) to increase material ductility. In another embodiment of the present disclosure, extruded pipes are welded together, adding additional flexibility to the assembly process because both ends of the battery system are open. This improves processes such as electrolyte fill and tab welding. It also enables larger diameter cylindrical cells with multiple tabs on both the anode and cathode.

In certain embodiments of the present disclosure, only the positive terminal may be formed on the top of the cell 102 with the negative terminal formed on the bottom of the cell and extending to the top shoulder of cell 102. In such embodiments, collector tab 106 must be extended to connect to positive terminal 108. Because the negative terminal extends to the top shoulder of the cell 102, a connection may be formed from the negative terminal to a negative collector plate (or another current collector). The negative terminal on the external portion of the cell is connected to the internal anode current collector of the battery cell 102. When the first collector plate 104 and a negative collector plate are both disposed on top of the cells 102, then a dielectric or insulating layer may be formed in between the layers. In an embodiment of the present disclosure, first collector plate 104 may be a sandwich structure in which a positive collector plate is formed in one plane and a negative collector plate is formed in another plane with an insulating plane in between. Connections to the positive terminal 108 may be made to the positive collector plate sitting in the top plane and connections to the negative terminal may be made to the negative collector plate sitting in the bottom plane (or vice-versa). The insulator and current collector can likely be prefabricated as a sub-assembly.

To establish connections with the anode and the cathode of the cell 102, top portions of the anode and cathode from each cell 102 and an underside of the first collector plate 104 (proximal to the cell 102) may be configured i.e., shaped and/or sized to facilitate ease in attaching the first collector plate 104 to the top portion of the anode and cathode from respective ones of the cells 102. For example, the top portion of the anode from each cell 102 may be flared outwardly from the axis AA' while the conductive portions 108 may be conically shaped. In this manner, attachment means including, but not limited to, a weld, solder, and the like may be easily implemented for use in establishing a connection of the first collector plate 104 with each cell 102 of the battery system 100. Moreover, in other embodiments of the present disclosure, the process of attaching the first collector plate 104 to each cell 102 of the battery system 100 may be performed as a single-step process i.e., together with a manufacture of each cell 102 that forms part of the battery system 100.

In other embodiments of the present disclosure, individual cells 102 are electrically connected, preferably, in parallel to one another via the collector tabs 106 connecting the positive terminals 108 to the first collector plate 104. In an embodiment of the present disclosure, all cells 102 operate at the same voltage, so a battery system would effectively create a large format (or capacity) cell from smaller building blocks. In certain embodiments of the present disclosure, the first collector plate 104 consists of a first printed circuit board (not shown) that has first conductive portions and the collector tabs 106 formed therein. In certain other embodiments of the present disclosure, the first printed circuit board may exhibit pre-defined amounts of rigidity and flexibility, to aid in connecting multiple battery systems to one another as part of the module-formation process.

In other embodiments of the present disclosure, one or both the internal electrodes of the cell 102 are directly connected to the first collector plate 104 or a negative collector plate. For example, the internal anode current collector may be connected to a negative collector plate or the internal cathode current collector may be connected to the first collector plate 104. In such an embodiment of the present disclosure, the first collector plate 104 or the negative collector plate must seal the internal electrolyte and other internal elements of cell 102.

Figure 2:
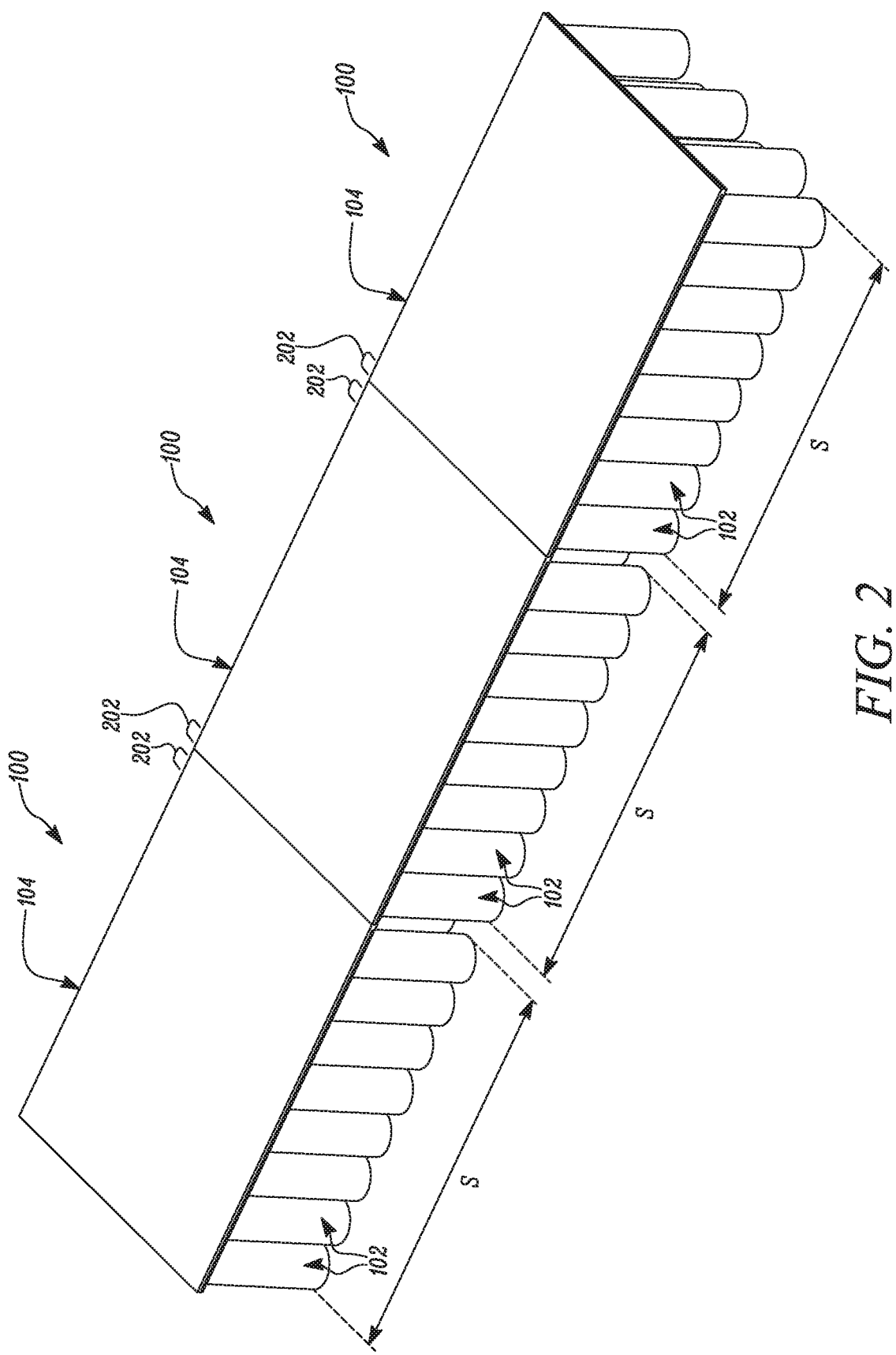
FIGS. 2 and 3 illustrate multiple battery systems that are connected in series using the first collector plates from corresponding ones of the multiple battery systems, according to certain embodiments of the present disclosure.
Figure 3:
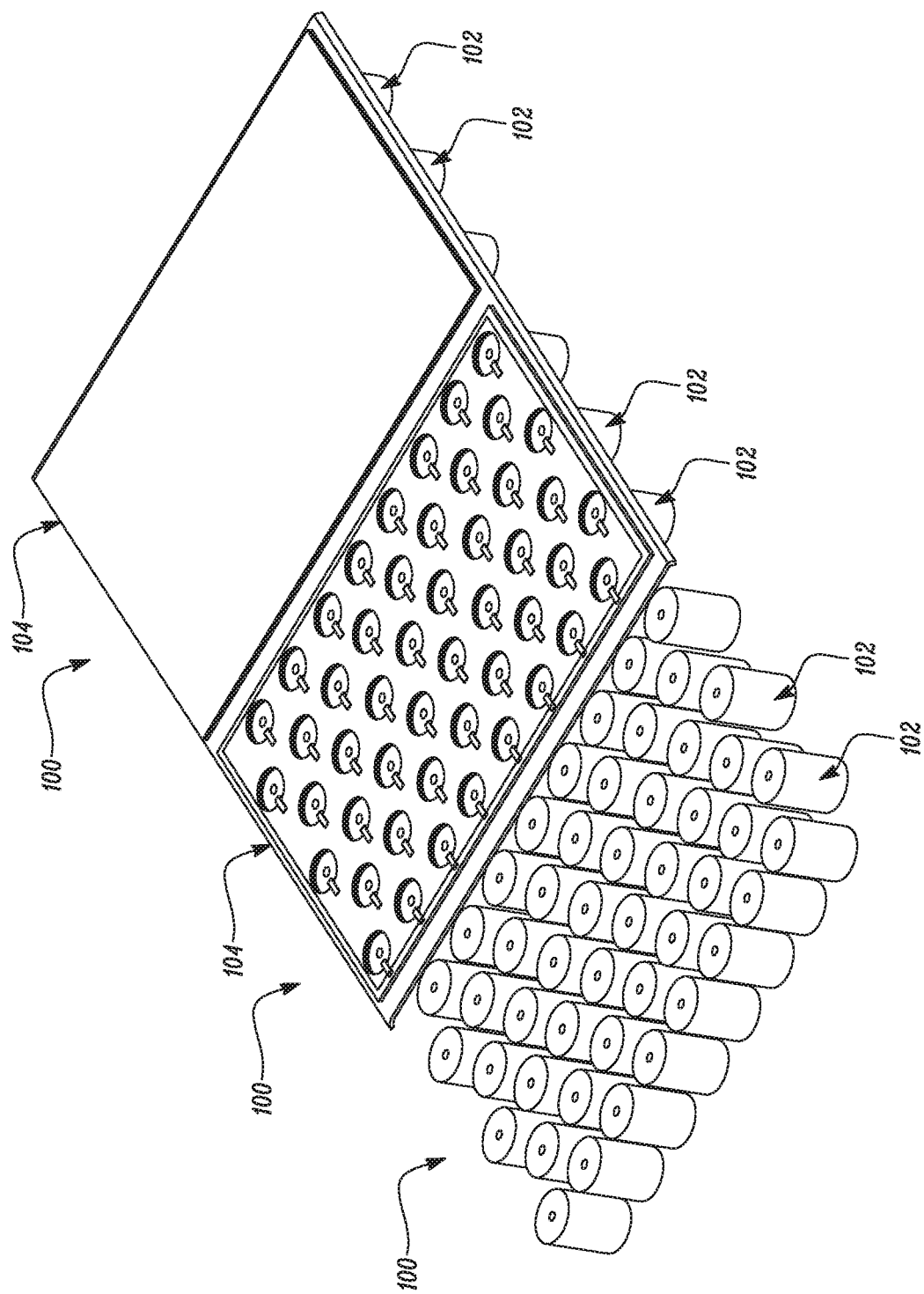

In an embodiment as shown in FIG. 2, the first collector plate 104 may extend in at least one direction to form a first overhang 202 beyond a span S associated with the cells 102 of the battery system 100. The first overhangs 202 from adjacently located first collector plates 104 (and associated battery systems 100) are joined to facilitate electrical connectivity from one first collector plate 104 to another. Referring to FIGS. 2 and 3, in certain embodiments of the present disclosure, while individual cells 102 from within a battery system 100 are connected, preferably, in parallel with each other, each battery system 100 would preferentially be connected in series with another battery system 100. The serial connection of individual battery systems 100 with one another would allow for a voltage greater than that would be typically achieved if individual battery systems 100 were to be connected in a parallel configuration.

Figure 4:
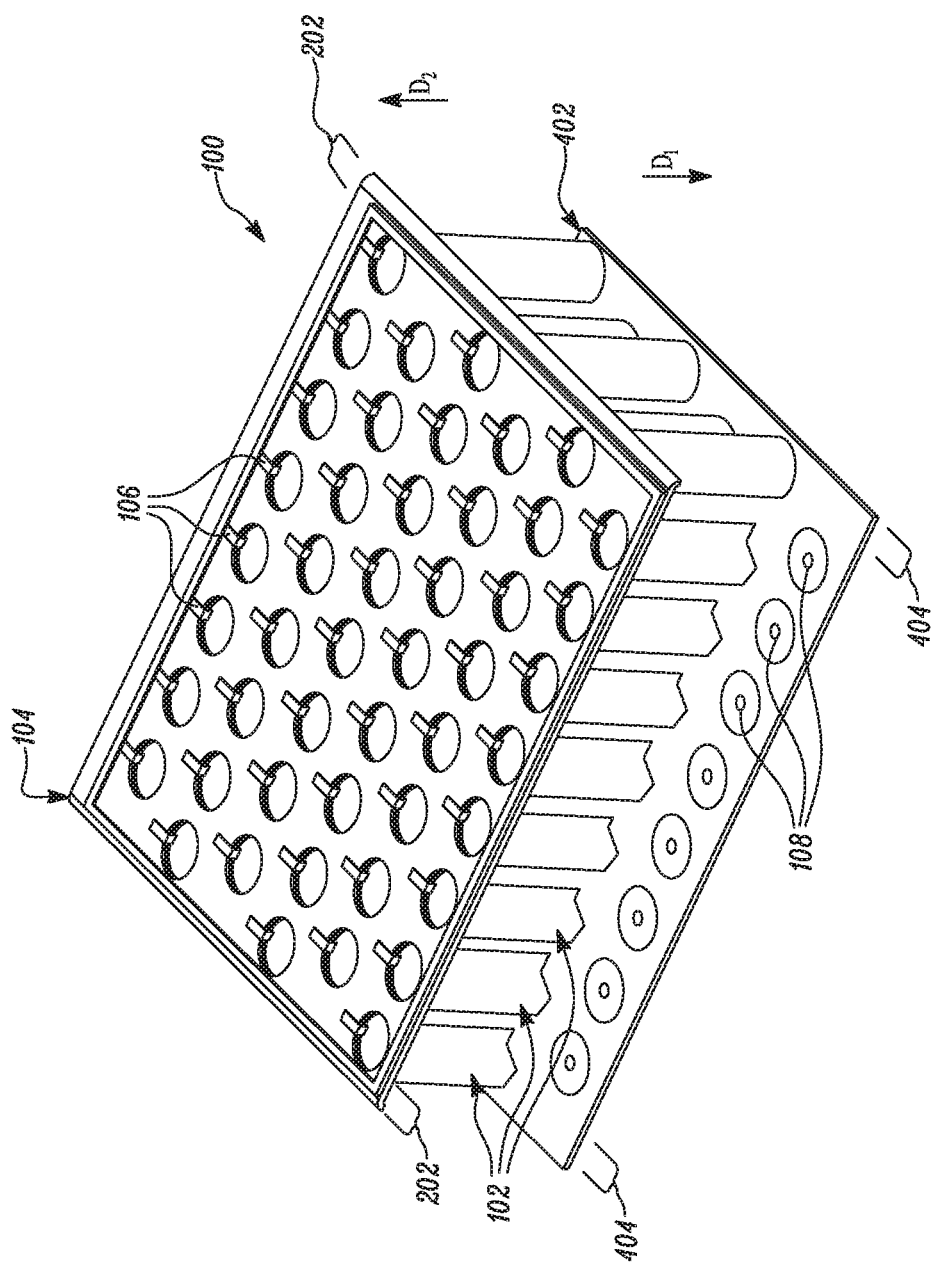
FIG. 4 illustrates a battery system showing first and second collector plates, according to certain embodiments of the present disclosure.

In an embodiment as shown in FIG. 4, the battery system 100 includes a second collector plate 402 connected to the negative terminal of cells 102. The configuration of the first and second collector plates 104, 402 may be beneficial when terminal portions of the cathode and anode from each cell 102 in the battery system 100 are disposed distally from each other, for example, facing opposite directions $D_1$, $D_2$ as shown in FIG. 4. In this embodiment, the first collector plate 104 would include the collector tabs 106 to electrically connect with the cathodes from respective cells 102 present in the battery system 100, while the second collector plate 402 would include the first conducting portions to electrically connect with the anodes from respective cells 102 present in the battery system 100. In certain embodiments of the present disclosure, the second collector plate 402 is formed from a metal, while in other embodiments, the second collector plate 402 is formed from a second printed circuit board (not shown) that would have the second conductive portions formed therein.

Further, in certain embodiments of the present disclosure, the second collector plate 402 extends in at least one direction to form a second overhang 404 beyond a span S associated with the cells 102 from the battery system 100. The second overhangs 404 from adjacently located second collector plates 402 may then be joined to facilitate electrical connectivity from one second collector plate 402 to another. Individual cells 102 would be electrically connected, preferably, in parallel with use of the second conductive portions, and each battery system 100 would be connected, preferably, in series with another battery system 100 with the help of the first and second collector plates 104, 402.

In certain embodiments of the present disclosure, one or both of the internal electrodes of the cell 102 are directly connected to the first or second collector plates 104, 402. For example, the internal anode current collector may be connected to the second collector plate 402 or the internal cathode current collector may be connected to the first collector plate 104. In such an embodiment of the present disclosure, the first or second collector plate 104, 402 must seal the internal electrolyte and other internal elements of each cell 102 present in the battery system 100.

Figure 5:
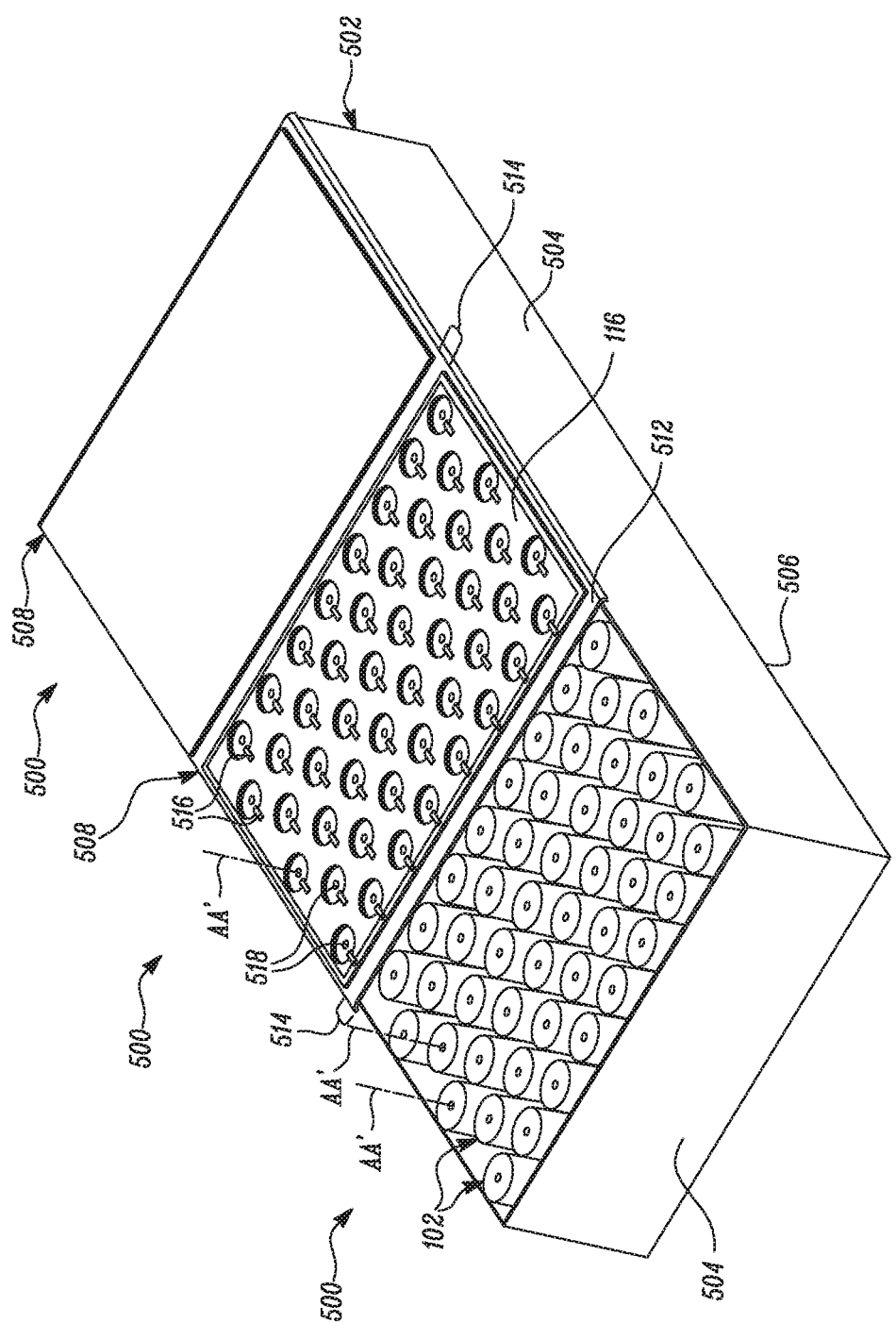
FIG. 5 illustrates a battery system having a container and multiple cells positioned within the container, according to certain embodiments of the present disclosure.

Referring to FIG. 5, a battery system 500 may, in accordance with certain other embodiments of the present disclosure, include a container 502. As shown, the container 502 has multiple sidewalls 504 adjoining one another. These sidewalls 504 may be bound by an end wall 506 that abuts one end of the sidewalls 504. The container 502, shown in the illustrated embodiment of FIG. 5, is shaped in the form of an open box. However, in alternative embodiments of the present disclosure, other shapes such as, but not limited to, a cylinder having one end open can be used in lieu of the open box for forming the container 502 disclosed herein.

Further, as shown in this embodiment, the cells 102 may be located within the container 502 and disposed in an upright manner on the end wall 506 such that axes AA' of the cells 102 are parallel to each other. Also, in this embodiment, the container 502 would include a collector module 508 that has multiple collector tabs 516 corresponding to the multiple cells 102 present in the battery system 500. Each collector tab 516 may be electrically connected to the positive terminal 518 of the cell 102. The positive terminal 518 is connected to the cell's internal cathode current collector (not shown).

Figure 12:
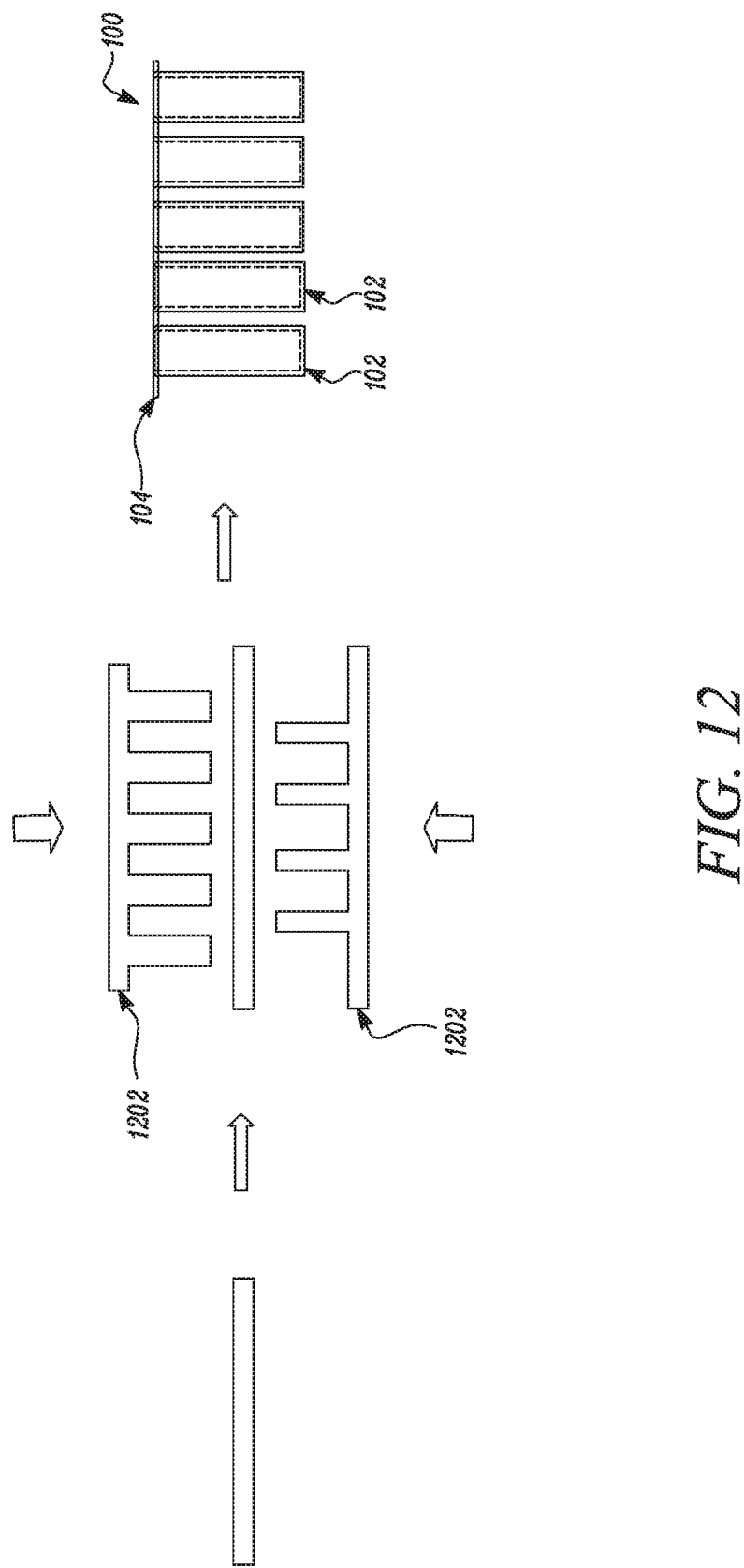
FIG. 12 illustrates an exemplary process of manufacturing a battery system, according to certain embodiments of the present disclosure.

The top cap of conventional cells has significant complexity that includes over current fuses and pressure release valves. According to another embodiment of the present disclosure, the battery system of cells disclosed herein would be configured to provide a common top cap, that could be manufactured e.g., stamped from a single part using a tool 1202 as shown in FIG. 12, reducing complexity and cost. Overpressure could be released with the help of a single pressure release valve for the battery system. In addition, the fuse functionality can be also put into the current collector, thereby eliminating significant complexity in the construction of the battery system disclosed herein.

The collector module 508 may be formed from multiple positive terminals 518 that correspond with the cells 102 of the battery system 500. As is the case of connections being established, preferably in a parallel manner, between individual cells 102 in the embodiments of FIGS. 1-4, in the embodiment of FIG. 5, individual cells 102 from each battery system 500 would be electrically connected, preferably, in parallel by connecting the collector tabs 516 to the positive terminals 518.

The collector module 508 may include a collector plate 512 that is made of a metal. A dielectric matrix may be overlaid or stacked atop the collector plate 512, for example, by adhesion, bonding, welding, or other methods commonly known to persons skilled in the art. The matrix could be incorporated with the collector tabs 516. In such a configuration, the collector tabs 516 may be positioned, at least partly, within the dielectric matrix and extend outwardly from the dielectric matrix at pre-designated locations that would correspond with a positioning of the cells 102 in the battery system 500. These collector tabs 516 would also be interconnected with one another internally, that is, within a volume of the matrix to connect the one or more cells 102 of the battery system 500 and an electrically powered device (not shown) to which the electrical current is to be routed. Alternatively, the collector module 508 may be a flexible circuit or printed circuit that includes features such as fuses, shunts, resistors, and sense circuit to improve the safety and control of the battery system.

In certain embodiments of the present disclosure, the collector module 508 is configured to extend in at least one direction to form an overhang 514 beyond the span S associated with the cells 102 of an associated battery system 500. The overhangs 514 from adjacently located collector modules 508 may be joined to facilitate electrical connectivity from one collector module 508 to another, and as disclosed earlier herein, the battery system 500 may be electrically connected, preferably, in series with another battery system 500 using the collector module 508.

Figure 6:
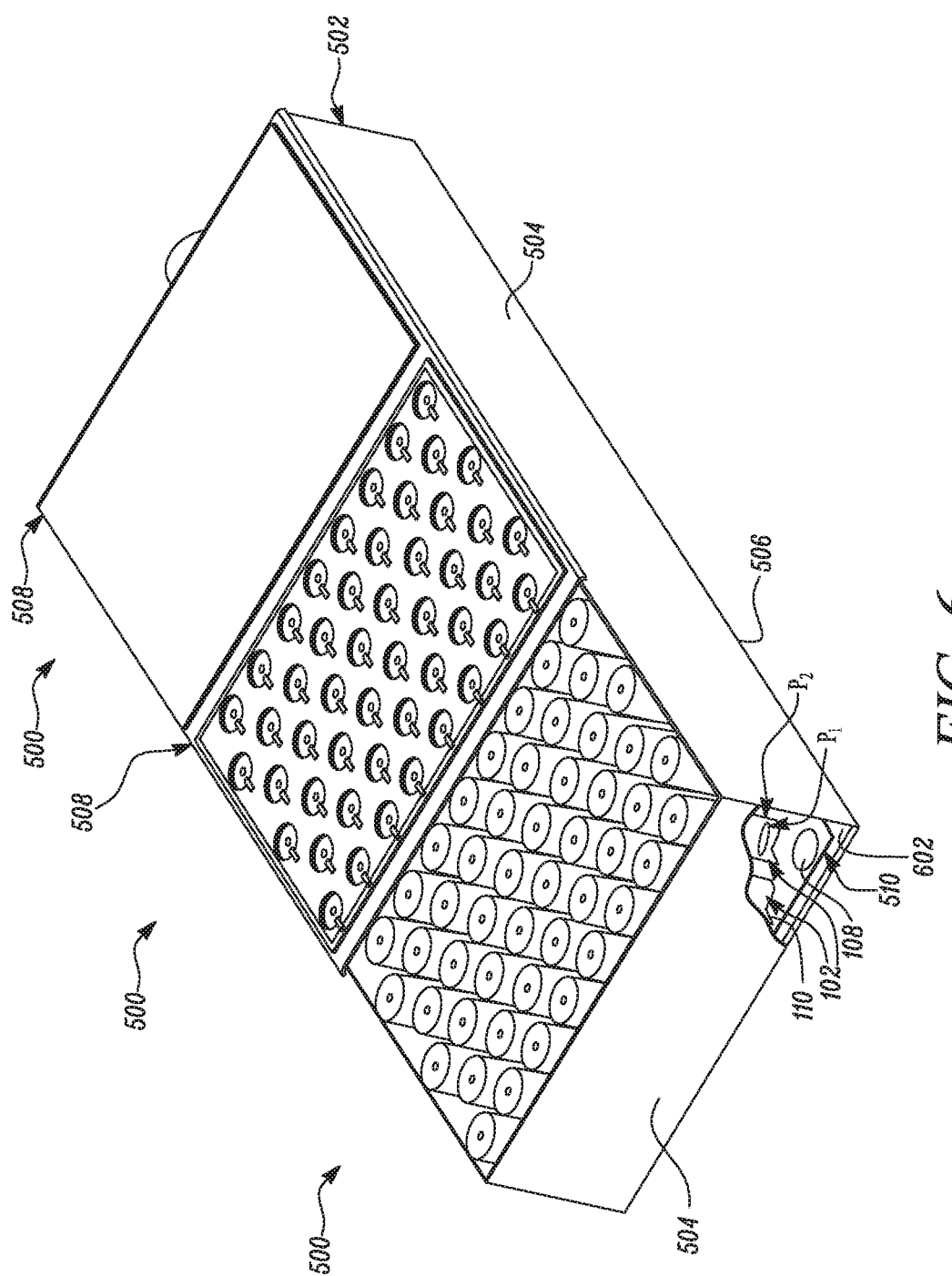
FIG. 6 illustrates a battery system showing a container, and a second collector plate positioned within the container, according to certain embodiments of the present disclosure.

In the embodiment of FIG. 6, a terminal portion of the anode may be located distally away from a terminal portion of the cathode. In such an embodiment, internal anode current collector of the cell 102 would be directly connected to a collector plate. That is the base 110 of the cell 102 may be formed out of the collector plate. In this embodiment, the internal anode current collector may have a perimeter $P_1$ that would be connected to a portion of the current collector that serves as the base 110 of the cell 102 and is indicated by perimeter $P_2$. In other embodiments of the present disclosure, the internal cathode current collector would also be connected to the first collector plate 104 directly, through a manner similar to that described above for the anode.

Figure 7:
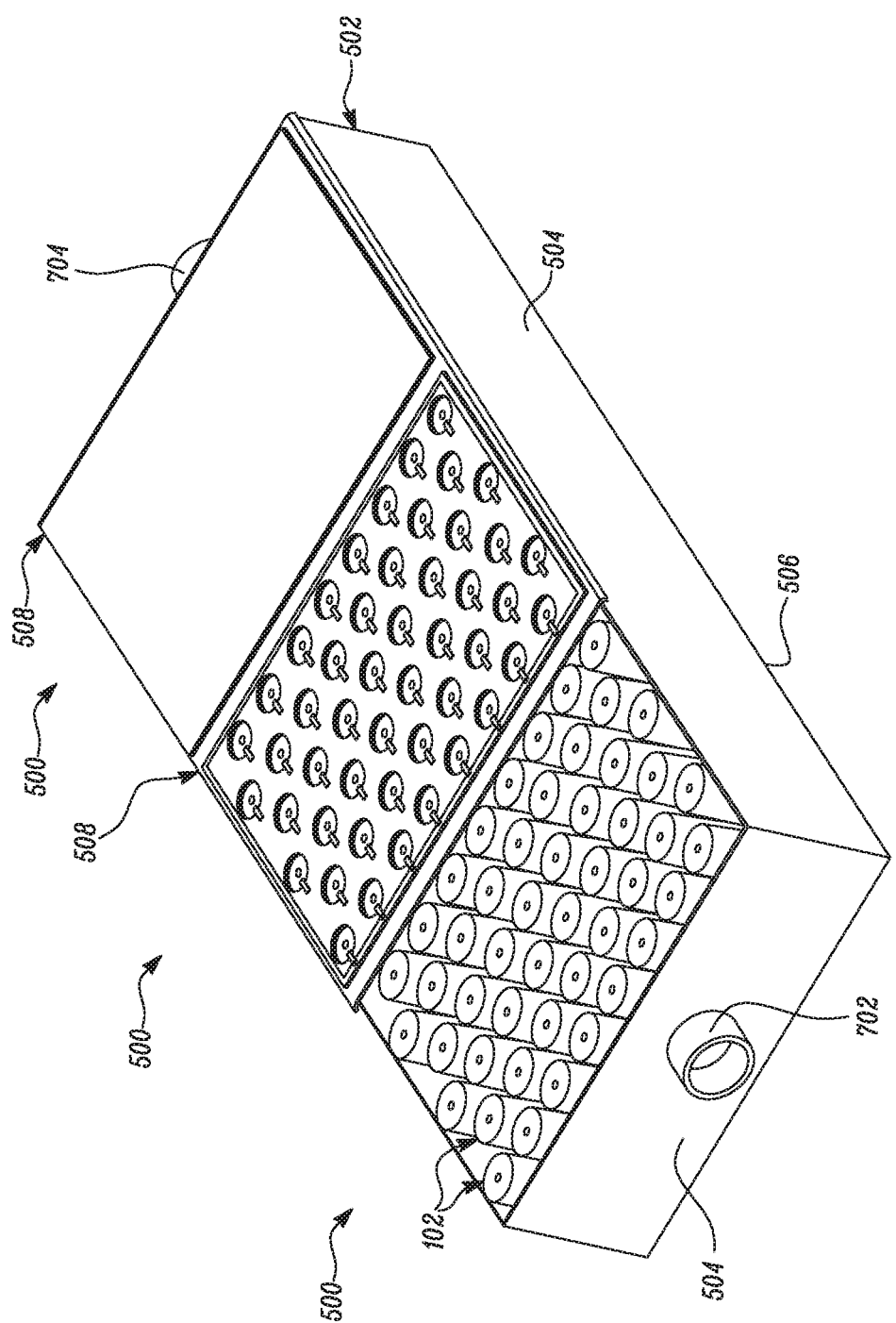
FIG. 7 illustrates a battery system having a container that includes an inlet and an outlet for allowing a cooling fluid to flow into and out of the container respectively, according to certain embodiments of the present disclosure.
Figure 8:
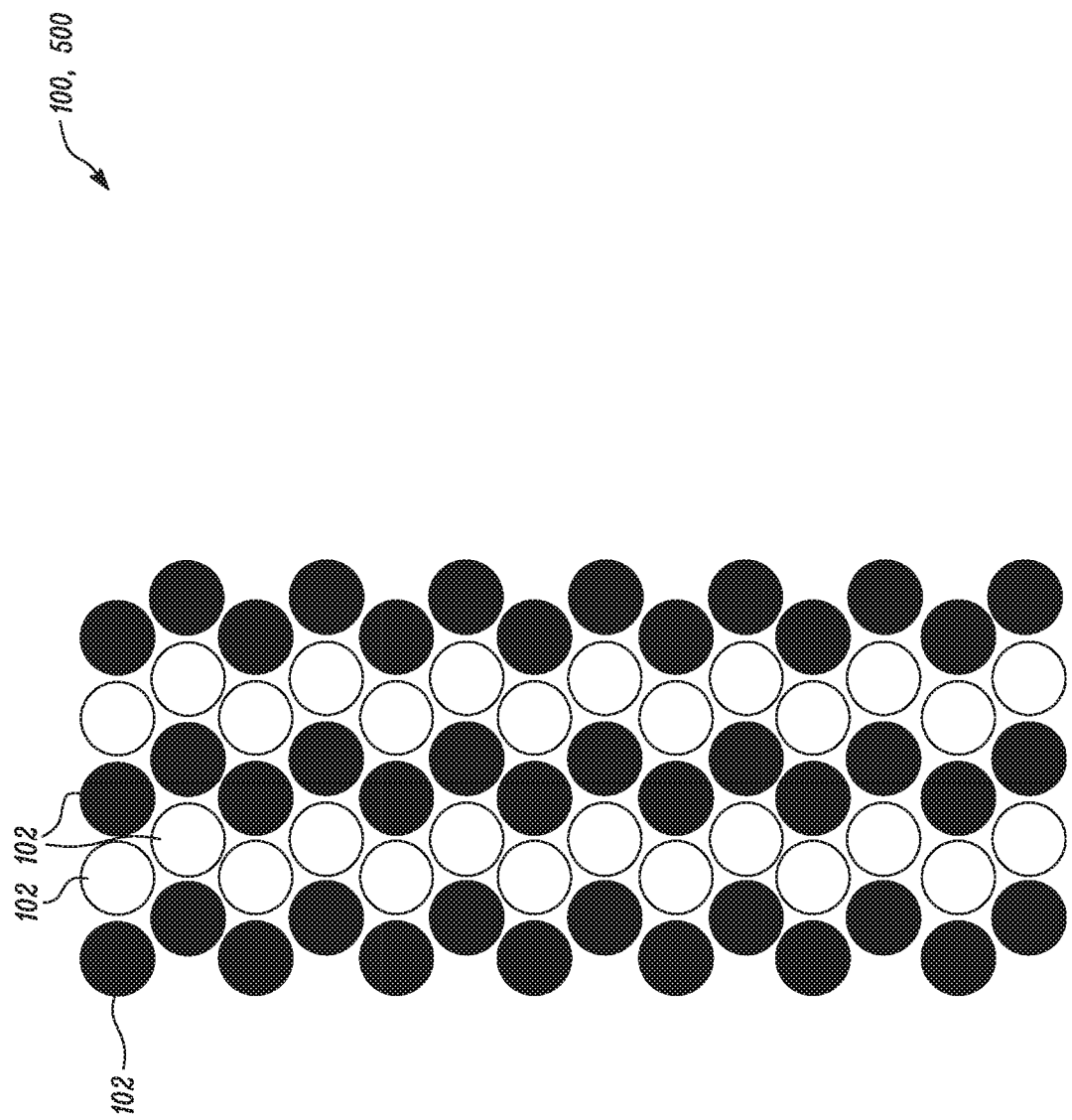
FIG. 8 illustrates a top view of the battery system showing a staggered array of cells, according to certain embodiments of the present disclosure.

In an embodiment as shown in FIG. 7, at least one of the sidewalls 504 of the container 502 includes an inlet 702 there through. Interstitial spaces between adjacent cells 102 within the container 502 could then be filled with a dielectric fluid via the inlet 702. Also, at least one of the sidewalls 504 of the container 502 could include an outlet 704 there through. The dielectric fluid between adjacent cells 102 within the container 502 could then be allowed to egress the container 502 via the outlet 704. The dielectric fluid may be used through active or passive cooling to dissipate heat away from the individual cells 102 of the battery system 500. Heat dissipation prolongs the service life of the battery system and improves the performance (rate and capacity) of the battery system 500, and the individual cells 102 present in the battery system 500. In certain other embodiments of the present disclosure, the cells 102 could be coated with an electrically insulating material and the fluid need not be a dielectric fluid. The inlet 702 from one container 502 may be connected to a source, or alternatively, with the outlet 704 of another container 502, and vice-versa depending on specific system design and upon considering heat transfer requirements associated therewith. In an embodiment of the present disclosure, the cells 102 are arranged in a staggered array format as best shown in FIG. 8, which optimizes both heat transfer and cylindrical packing density. The cell enclosure may have localized surface features such as roughness or fins to improve the heat transfer performance.

In some specific industrial applications, for example, an HVAC system energy consumption, and for improved individual cell-level performance, minimal thermal resistance between the cells and the cooling medium would be desired. The battery system architecture disclosed herein helps to minimize and achieve the lowest thermal resistance. In certain embodiments of the present disclosure, the inlet 702 and the outlet 704 may also have features that help spread the fluid flow across a width of the battery system 500, for example, by internally channeling fluid, breakwater features, or another feature. This immersion cooling method facilitates a low thermal resistance between the cells and the cooling medium. This means that the cells will be close to, or in other words—within a pre-defined allowable range of tolerance with respect to, the temperature of the cooling fluid at all times. Further, it is hereby envisioned that in order to reduce the cell to cell temperature variance, several approaches could be utilized. In some other embodiments, the heat capacity of the motive fluid could be increased by increasing the mass flow rate or specific heat of the motive fluid. Additionally, the fluid circuit could be configured to have multiple flow paths in parallel so as to decrease the number of cells each body of fluid encounters prior to the fluid being returned to the temperature control system, typically a heat exchanger. Optionally, the fluid could be made to change direction within a volume of the container. The specific heat of a cell could help stabilize the overall temperature of the battery system as well. The cells that are getting the hottest fluid will then get the coldest fluid after the direction of flow associated with the fluid changes. The change in flow direction of the fluid could be accomplished with a valve or by routing the fluid to a different pump with a different orientation.

In an additional embodiment, the space around the outside of cells could be filled with a potting material. This potting material could improve both structural and thermal integrity of the battery system. Further, this potting material is selected so that it changes phase around the cell operating temperature, for example, approximately about 30° C. As the cells generate heat, from the internal electrical resistance, the protection circuit module (PCM) will begin to change the phase of the potting material, typically from a solid to a liquid. The amount of the potting material that is being converted into a liquid state would increase but its overall temperature would remain at the phase change temperature. When the phase-changing potting material becomes predominantly liquid, external cooling would be needed. This can be achieved by one or more cooling channels that could be built into a volume of each cell, or alternatively, into a volume of the container associated with the battery system. When incorporated within the volume of the container, the container could also have corresponding locating, aligning, and/or indexing features structurally defined therein to help simplify and expedite the assembly of cells into the container, besides improving the rate of heat transfer by increasing an amount of cell area that could be disposed in contact with the channels conveying the cooling fluid therein.

The cooling channels may hold water, a water-glycol mixture, or a refrigerant from a central heat exchanger, for example, a chiller. The cooling fluid will cause the PCM to move from primary liquid to a solid state. PCMs typically have low thermal conductivity. This battery system structure would be sensitive in its thermal conductivity relative to the PCMs owing, at least in part, to a small scale of separation between cells and the PCM. Additionally, it is envisioned that minimal material and/or features would be needed to incorporate the PCM functionality disclosed herein. Such a configuration may offer numerous advantages. For example, the HVAC system performance could be significantly improved due to the presence of a thermal energy storage component. Moreover, the conduits, pumps, heat exchangers, and chillers could be sized for average load rather than peak load demand on the battery system. Pumping power from pumps, if incorporated, could be optimized as fluid flow through the cooling channels would be needed merely on an intermittent basis.

Further, other advantageous system level trade-offs can be made due to the flexibility offered by the thermal energy storage component. For instance, overall battery system performance could be improved owing to each cell or battery system temperature being held in a close range with one another, such range falling within a pre-defined allowable temperature range. Also, storage, operating performance, and warm up time of the battery system in cold weather can be improved due to the presence and co-operation of the thermal energy storage component with the battery system. Additionally, the PCM may be configured to aid in the safety of the battery system in cases of a cell thermal runaway. In such an embodiment, the PCM has a second phase change, for example, at about 180° C., to aid in the adsorption and dissipation of heat during cases of thermal runaway. Typically, a cell can give off around 200 KJ-500 KJ during thermal runaway. This heat would need to be effectively dispersed so that other neighboring cells do not go into thermal runaway. Instead, in the case of a thermal runaway occurring with one cell at first, the PCM would begin to change phase, and particularly, the temperature of the PCM would move above its boiling point. The vapor from the boiling fluid will then spread through the battery system dissipating heat over a large thermal capacity to reduce localized zones of relatively high temperature and hence, prevent a chain reaction of thermal runaways of other cells in the battery system. It is hereby envisioned that vapor channels could also be built in to the PCM structure to mitigate the possibility of localized heat zones that could otherwise cause extreme temperature and/or pressure to build up within the battery pack.

Figure 9:
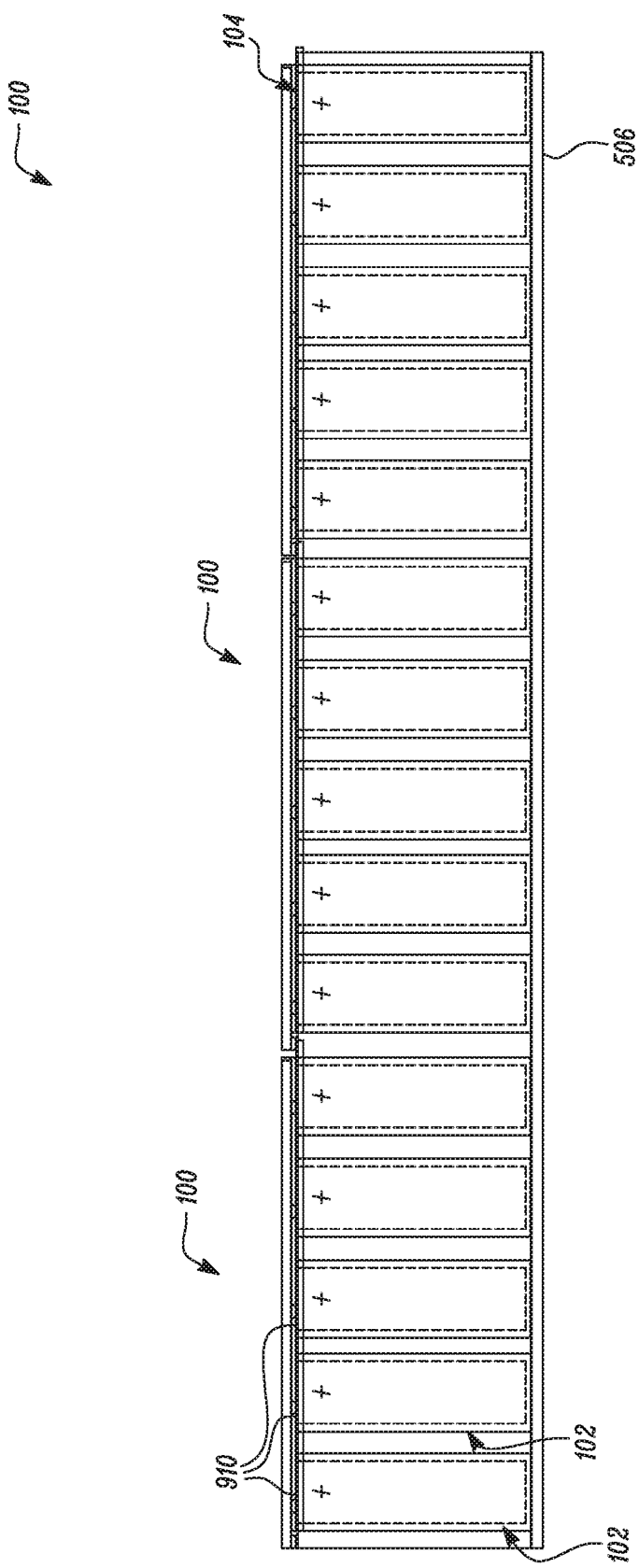
FIGS. 9-11 illustrates different configurations of a battery system, according to certain embodiments of the present disclosure.

In certain embodiments, the battery system 100 could be single sided such that a single current collector plate 104 would be arranged on one side of the cell 102 as shown in FIG. 9. This current collector plate 104 could include positive terminals while a top cap of each cell 102 could include the negative terminal for the corresponding cell 102. Additionally, the base 110 of the container 502 could be configured bear the other side of the cell 102. Moreover, the first five cells 102 are grouped together using a common collector module. Likewise, the second and third sets of five cells 102 each would be grouped together using a common collector module each. The groups of five cells 102 each would then be facilitated, for example, through charge balancing mechanisms, discharge balancing mechanisms, and overcharge protection mechanisms that are integrated into the common collector module, for remaining at a uniform voltage level at all times.

Although in the foregoing embodiment of FIG. 9, the number of cells 102 present in each group is five, such number of cells is exemplary in nature, and hence, non-limiting of the present disclosure. In other embodiments, the number of cells 102 included to form part of a group may be vary depending on specific requirements of a battery powered application. Further, when multiple groups of cells are present in a battery pack, the number of cells present in each group of the battery pack may be similar, or dissimilar to each other.

Figure 10:
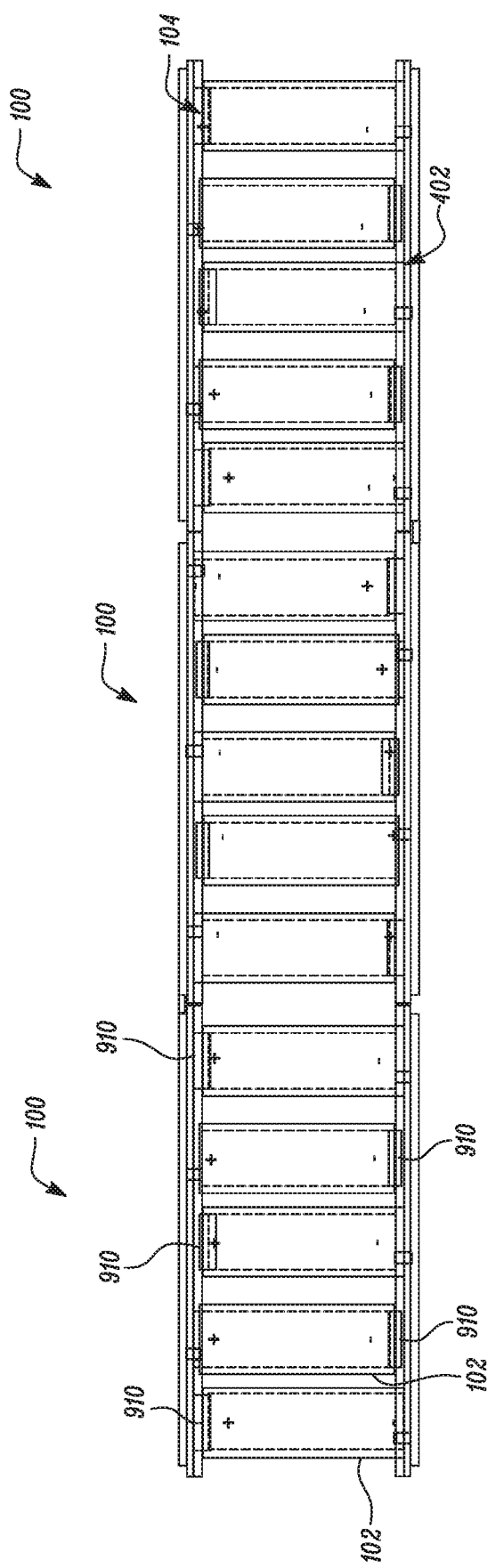
Figure 11:
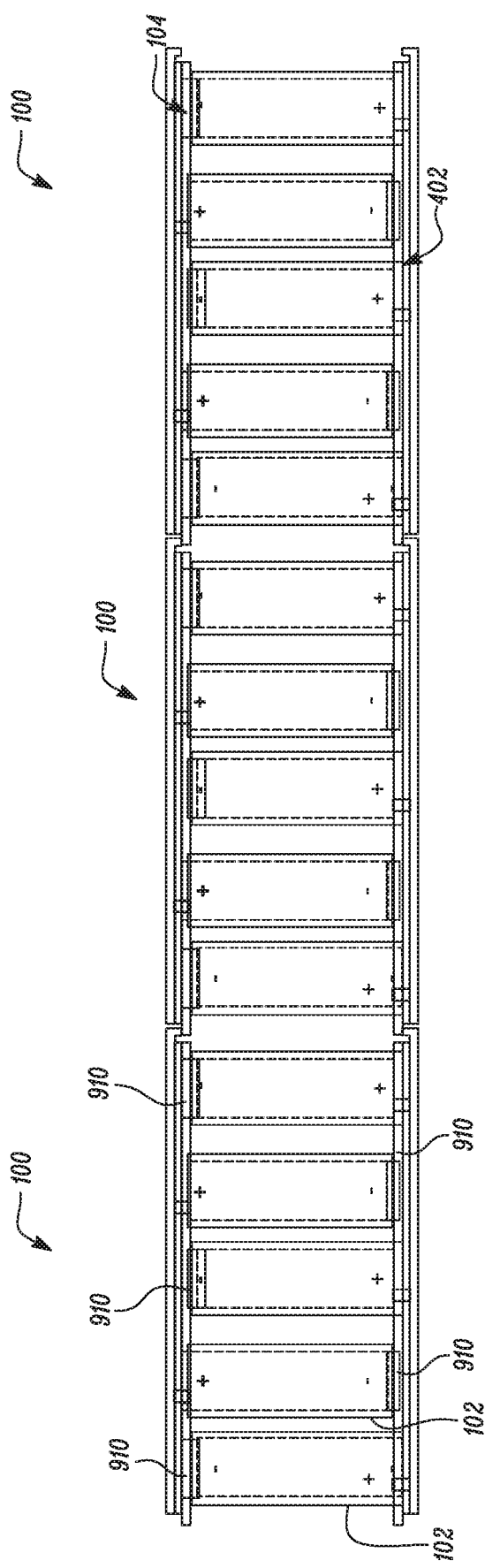

In other embodiments of the present disclosure, the battery system would be double sided, that is, a pair of current collector plates 104, 402 would be arranged on either side of the cell as shown in FIG. 10. Moreover, in an embodiment shown in FIG. 10, the cells 102 could be connected to the current collector plates 104, 402 with the cells 102 being positioned to exhibit same polarity on one side of the battery pack 100. Alternatively, the cells 102 could be connected to the current collector plates 104, 402 with reversed polarity as shown in the illustrated embodiment of FIG. 11. With reversed polarity, the voltage drops across each battery system 100 could be made twice that of an individual cell 102. In certain embodiments of the present disclosure, as shown in FIGS. 9-11, individual cells 102 may be connected via welds 910 to current collector plates 104, 402. The sandwich configurations disclosed in conjunction with FIGS. 9-11 would also help increase the packing density of the cells 102 and eliminate the need for a container and its associated components. It may be noted that in such an embodiment, all components that merely serve a structural and/or fluid conduit purpose would be eliminated.

Figure 13:
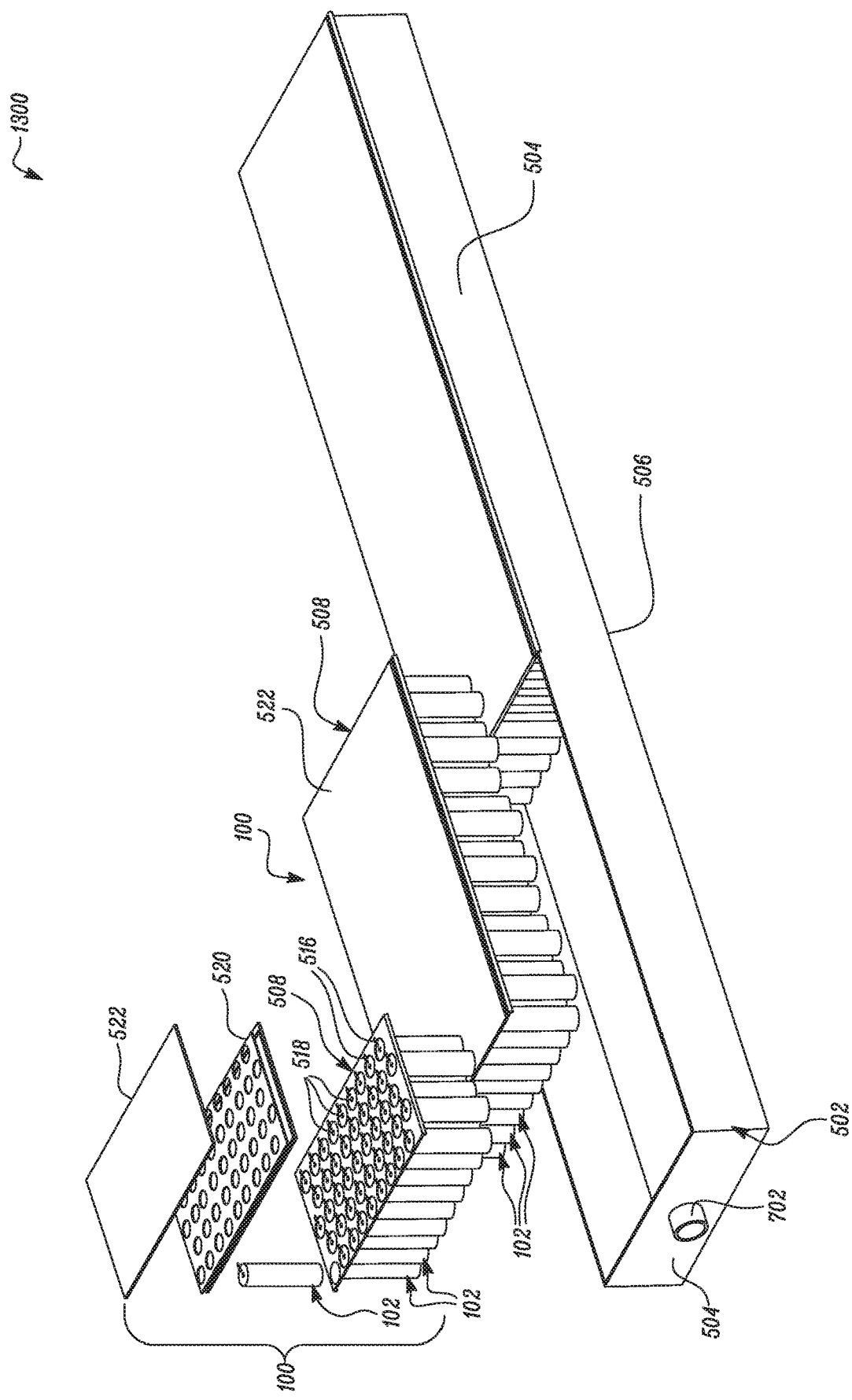
FIG. 13 illustrates a battery pack made up of multiple battery systems grouped together and positioned within a container, according to certain embodiments of the present disclosure.

Referring to FIG. 13, a battery pack 1300 is shown including multiple battery systems 100 that are grouped together and positioned within a container 502. Each battery system 100 depicted in the view of FIG. 13 may include a single sided collector module 508 that is configured similar to that shown in FIG. 9, or alternatively, the battery system 100 may be configured as shown in the views of FIG. 10 or 11 respectively. The single sided collector module 508 may have collector tabs 516 that connect with positive terminals 518 of each cell 102 with negative terminals integrated into the top cap of each cell 102. Moreover, as shown, these collector tabs 516 may be overlaid with a dielectric matrix 520, and a cover member 522 that could be stacked upon the dielectric matrix 520.

During manufacture of the battery pack 1300, the grouping of cells 102, the assembly of cells 102 together with the collector module 508, and the integration with other systems disclosed herein, such as the thermal management system, may be carried out in any sequence that would help manufacturers expedite the assembly of the battery pack 1300 while ensuring that electrolyte and cooling fluid are confined to their respective operating zones when assembled. That is, the electrolyte is confined within a volume of each cell 102, while the cooling fluid would be confined to a zone, for example, within cooling channels that could be associated either with the cell 102 and such cooling channels would be configured to prevent the cooling fluid from coming into contact with the electrolyte, or alternatively, within cooling channels that could be built outside of each cell 102 and within a volume of the container 502.

From a modularity standpoint, for battery pack products, it is traditionally known to offer multiple variants of battery systems or packs, each having a different energy storage capacity. A low-end battery pack may have around two-thirds of the capacity that is typical of a high-end battery pack. Also, as there are concomitant advantages, for example, reduced hardware usage on the electronics side such as, but not limited to, DC-DC converters and cabling that could be needed in order to keep the same number of cells arranged in series, in an embodiment, instead the number of cells that are arranged in parallel is changed. For example, a set of cells arranged in parallel may be arranged into for example, three battery modules or systems. The low-end battery pack may have two modular parts in parallel while the high-end battery pack may have three or four modular parts in parallel. This enable economies of scale and in some cases, also help manufacturers to effectively reduce the number of unique parts required to form a battery pack.

The foregoing disclosure is not intended to limit the present disclosure to the precise forms or embodiments disclosed herein. As such, it is contemplated that various alternative forms, embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all of which would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., coupled, associated, connected, and the like) are only used to aid the reader's understanding of the present disclosure, and may not create limitations, particularly as to the position, orientation, or use of the elements disclosed herein. Therefore, joinder references, if any, are to be construed broadly. Moreover, such joinder references may not necessarily infer that two elements are directly connected to each other.

Additionally, all numerical terms, such as, but not limited to, "first", "second", "one", "another", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. A battery system comprising:
   a plurality of cells arranged in an upright manner such that axes of the cells are parallel to each other;
   a first collector plate having a plurality of collector tabs corresponding to the plurality of cells, each collector tab connected to a cathode of a corresponding cell from the plurality of cells; and
   a second collector plate having a plurality of conductive portions corresponding to the plurality of cells, each conductive portion connected to an anode of a corresponding cell from the plurality of cells,
   wherein the first collector plate and the second collector plate are disposed distally from each other and face opposite directions,
   wherein the second collector plate is formed from a printed circuit board that has the conductive portions formed therein, wherein the first collector plate includes a plurality of different conductive portions, wherein the first collector plate is made of a metal, and wherein the second collector plate is a base of the cells.

2. The battery system of claim 1, wherein individual cells are electrically connected in parallel via respective ones of the collector tabs and the conductive portions.

3. The battery system of claim 1, wherein the first collector plate includes:
   the different conductive portions; and
   a first dielectric matrix overlaid thereon, wherein the collector tabs are positioned, at least partly within the first dielectric matrix, and are routed in an electrically isolated manner with respect to the first conductive portions to connect with the cathodes from corresponding ones of the cells in the battery system.

4. The battery system of claim 1 further comprising a first overhang beyond a span associated with the plurality of cells that is based on the first collector plate extending in at least one direction.

5. The battery system of claim 4, wherein the first overhang and a second overhang from an adjacently located collector plate are joined to facilitate electrical connectivity from the first collector plate to the adjacently located collector plate.

6. The battery system of claim 1, wherein the battery system is electrically connected in series with another battery system via the first collector plate.

7. The battery system of claim 1 further comprising a second overhang beyond a span associated with the plurality of cells that is based on the second collector plate extending in at least one direction.

8. The battery system of claim 7, wherein the second overhang and a third overhang from an adjacently located collector plate are joined to facilitate electrical connectivity from the second collector plate to the adjacently located collector plate.

9. The battery system of claim 1, wherein individual cells are electrically connected in parallel via respective second conductive portions.

10. The battery system of claim 1, wherein the battery system is electrically connected in series with another battery system via respective ones of the first and second collector plates.

11. The battery system of claim 1, wherein the second collector plate is formed from a second printed circuit board having the second conductive portions formed therein.

12. A battery system comprising:
    a container having a plurality of sidewalls adjoining one another and bound by an end wall disposed on one side of the plurality of sidewalls;
    a plurality of cells located within the container and disposed in an upright manner on the end wall such that axes of the cells are parallel to each other; and
    a collector module having a plurality of collector tabs corresponding to the plurality of cells, each collector tab electrically connected with a cathode of a corresponding cell from the plurality of cells,
    wherein a base of the cells is formed out of a collector plate, wherein respective anodes of the plurality of cells are directly connected to the collector plate, and wherein the base is configured to seal internal elements of the cells.

13. The battery system of claim 12, wherein the collector module includes a plurality of conductive portions corresponding to the plurality of cells, the conductive portions electrically isolated from the collector tabs.

14. The battery system of claim 13, wherein the collector tabs are located adjacent to corresponding ones of the conductive portions.

15. The battery system of claim 13, wherein individual cells are electrically connected in parallel via respective ones of the collector tabs and the conductive portions.

16. The battery system of claim 13, wherein the collector module is formed from a printed circuit board having the conductive portions and the collector tabs formed therein.

17. The battery system of claim 12, wherein the collector module is made from a metal.

18. The battery system of claim 12 further comprising an overhang beyond a span associated with the plurality of cells that is based on the collector module extending in at least one direction.

19. The battery system of claim 18, wherein the overhang and a different overhang from an adjacently located collector module are joined to facilitate electrical connectivity from the collector module to the adjacently located collector module.

20. The battery system of claim 12, wherein the battery system is electrically connected in series with another battery system via the collector module.

21. The battery system of claim 12, wherein a perimeter associated with a terminal portion of an anode from each cell is less than a perimeter associated with a base of an associated cell.

22. The battery system of claim 12, wherein at least one of the sidewalls of the container includes an inlet therethrough.

23. The battery system of claim 22, wherein interstitial spaces within the container between adjacent cells is filled with a dielectric fluid via the inlet.

24. The battery system of claim 22, wherein at least one of the sidewalls of the container includes an outlet therethrough.

25. The battery system of claim 24, wherein dielectric fluid between adjacent cells within the container is allowed to egress the container via the outlet.

26. The battery system of claim 12, wherein the internal elements of an individual cell comprise internal electrolytes of the individual cell.

27. A battery system comprising:
a plurality of cells arranged in a common cell enclosure, wherein the common cell enclosure provides structure for the plurality of cells and comprises a heat transfer fluid conduit; and
a first collector plate with multiple collector tabs that correspond to multiple cells, wherein each collector tab is connected to a cathode of one of the plurality of cells,
wherein a base of the cells is formed out of a second collector plate, wherein respective anodes of the plurality of cells are directly connected to the second collector plate, and wherein the base is configured to seal internal elements of the cells.

28. The battery system of claim 27, wherein the internal elements of an individual cell comprise internal electrolytes of the individual cell.

* * * * *